(12) United States Patent
Marmet

(10) Patent No.: US 11,740,362 B2
(45) Date of Patent: Aug. 29, 2023

(54) RECEIVER-INDEPENDENT SPOOFING DETECTION DEVICE

(71) Applicant: CENTRE NATIONAL D'ETUDES SPATIALES, Paris (FR)

(72) Inventor: François-Xavier Marmet, Muret (FR)

(73) Assignee: CENTRE NATIONAL D'ETUDES SPATIALES (CNES), Paris (FR)

( * ) Notice: Subject to any disclaimer, the term of this patent is extended or adjusted under 35 U.S.C. 154(b) by 232 days.

(21) Appl. No.: 16/771,210

(22) PCT Filed: Dec. 11, 2018

(86) PCT No.: PCT/EP2018/084271
§ 371 (c)(1),
(2) Date: Jun. 9, 2020

(87) PCT Pub. No.: WO2019/121135
PCT Pub. Date: Jun. 27, 2019

(65) Prior Publication Data
US 2020/0371247 A1 Nov. 26, 2020

(30) Foreign Application Priority Data
Dec. 20, 2017 (EP) .................................. 17306853

(51) Int. Cl.
*G01S 19/21* (2010.01)
*G01S 19/01* (2010.01)
*G01S 19/25* (2010.01)

(52) U.S. Cl.
CPC .......... *G01S 19/215* (2013.01); *G01S 19/015* (2013.01); *G01S 19/254* (2013.01)

(58) Field of Classification Search
CPC ..... G01S 19/015; G01S 19/215; G01S 19/254
See application file for complete search history.

(56) References Cited

U.S. PATENT DOCUMENTS

| 6,975,673 B1 * | 12/2005 | Rouquette ............ H04B 1/7102 375/E1.023 |
| 2008/0068260 A1 | 3/2008 | Schipper et al. |

(Continued)

FOREIGN PATENT DOCUMENTS

| CN | 103901446 | 7/2014 |
| CN | 104155662 | 11/2014 |

(Continued)

OTHER PUBLICATIONS

Butsch, Felix. "A concept for GNSS interference monitoring." Proceedings of the 12th International Technical Meeting of the Satellite Division of The Institute of Navigation (ION GPS 1999). 1999. (Year: 1999).*

(Continued)

*Primary Examiner* — Peter M Bythrow
*Assistant Examiner* — Nazra Nur Waheed
(74) *Attorney, Agent, or Firm* — Burris Law, PLLC

(57) ABSTRACT

A device and the associated method for detecting spoofing of GNSS signals are provided. The device includes an RF chain to acquire and down convert a signal comprising one or more GNSS signals transmitted by GNSS sources, each of the GNSS signals comprising a navigation message modulated by a spreading code associated to a related GNSS source, an analog to digital converter, to digitize the down converted signal, and a computer logic, to: calculate over a grid of spreading code phase delays and Doppler shifts, cross-correlation functions between the digitized signal and locally generated replicas of the signal, for one or more of the spreading codes, identify cross-correlation peaks, and analyze the cross-correlation peaks to detect spoofing situations.

14 Claims, 9 Drawing Sheets

(56) References Cited

U.S. PATENT DOCUMENTS

| | | | |
|---|---|---|---|
| 2010/0117899 A1* | 5/2010 | Papadimitratos | G01S 19/20 342/357.62 |
| 2010/0316095 A1 | 12/2010 | Simic et al. | |
| 2012/0250733 A1 | 10/2012 | King | |
| 2014/0132446 A1* | 5/2014 | Lennen | G01S 19/13 342/357.51 |
| 2016/0047915 A1 | 2/2016 | Raasakka et al. | |
| 2018/0217266 A1* | 8/2018 | Kim | G01S 13/781 |

FOREIGN PATENT DOCUMENTS

| | | |
|---|---|---|
| CN | 104345321 | 2/2015 |
| CN | 105717518 | 6/2016 |
| CN | 107247276 | 10/2017 |
| WO | 2008024534 | 2/2008 |

OTHER PUBLICATIONS

Wen, Hengqing, et al. "Countermeasures for GPS signal spoofing." Proceedings of the 18th international technical meeting of the satellite division of the institute of navigation (ION GNSS 2005). 2005. (Year: 2005).*

Ranganathan, Aanjhan, Hildur Ólafsdóttir, and Srdjan Capkun. "Spree: A spoofing resistant gps receiver." Proceedings of the 22nd Annual International Conference on Mobile Computing and Networking. 2016. (Year: 2016).*

Butsch, et al., "A Concept for GNSS Interfence Monitoring", Proceedings of the 12th International Technical Meeting of the Satellite Division of The Institute of Navigation (ION GPS 1999), No. 12, pp. 125-135, Sep. 14-17, 1999.

Wen, et al., "Countermeasures for GPS Signal Spoofing", Proceedings of ION GPS, No. 18, pp. 1285-1390, Sep. 13, 2005.

Ranganathan, et al., "SPREE: A Spoofing Resistant GPS Receiver", Proceedings of the 22nd Annual International Conference on Mobile Computing and Networking, Mar. 17, 2016.

Ledvina, et al., "An in-line anti-spoofing device for legacy civil GPS receivers", ION 2010 International technical meeting, pp. 698-712, Jan. 25, 2010.

Office Action and Search Report issued in corresponding CN Application 201880082231.8, dated Apr. 4, 2023, 20 pages.

* cited by examiner

RECEIVER-INDEPENDENT SPOOFING DETECTION DEVICE

CROSS-REFERENCE TO RELATED APPLICATIONS

This application is a National Stage of International patent application PCT/EP2018/084271, filed on Dec. 11, 2018, which claims priority to foreign European patent application No. EP 17306853.7, filed on Dec. 20, 2017, the disclosures of which are incorporated by reference in their entirety.

FIELD OF THE INVENTION

The present invention relates generally to satellite based positioning techniques, and more particularly to a device and associated method to detect spoofing of a GNSS (acronym for Global Navigation Satellite Systems) signal.

BACKGROUND PRIOR ART

Applications based on positioning information are taking an increasing place in today's society. These include Location Based Services (LBS), which intend to provide to a user a content that is relevant to its position, augmented reality applications, navigation systems, and many others. This trend is expected to further increase with the emerging market of autonomous vehicles (cars, trucks, boats, . . . ). Among the existing positioning techniques, GNSS-based techniques have proven to be the best candidates, because they provide high accuracy with a worldwide coverage.

GNSS positioning techniques have been used and improved for many years now. Two Global Navigation Satellite Systems (GNSS) have been fully deployed for a number of years (the US Global Positioning System (GPS™) and the Russian GLONASS™) and two more are under deployment (the Chinese Beidou™ Navigation Satellite System and the European Galileo™ system).

The way GNSS systems operate is the following: a fleet of satellites, embedding high precision atomic clocks, transmit signals made of a navigation message modulated by a spreading sequence, generally a pseudo random noise (PRN) sequence, further modulated and shifted to a carrier frequency. Different services may be provided over different carrier frequencies, each satellites transmitting over one or more frequencies. The signals transmitted by different satellites on the same carrier frequency use different pseudo random sequences so that they can be separated by a receiver. The navigation message comprises information like the time at which the message is transmitted, and information about the position of the various satellites.

FIG. 1 schematically illustrates the main processing of a GNSS receiver 100 according to the prior art. It is connected to an antenna 101, to receive a GNSS signal which is the sum of all the transmissions made by GNSS satellites in view of the receiver and comprises an RF (acronym for Radio Frequency) chain 102 for processing the received signal. This RF chain filters the signal, transposes it to baseband or intermediate frequency, adjusts the received signal power, and digitizes it.

Once digitized, the signal is processed by a set of processing channels 103. Typically, there are at least 24 of those. Processing channels contain tracking loops. Each tracking loop is in charge of determining the time at which a GNSS signal is transmitted by one particular satellite, based on the associated pseudo random sequence. Cross-correlation between the received signal and a local replica of the expected signal, considering the appropriate pseudo random sequence, is performed. When a cross-correlation peak exceeds a threshold, the position of the maximum of the synchronization peak is used, along with the transmission time retrieved from the navigation message, to calculate an information, called pseudo-range, which is representative of a distance between the receiver and the associated satellite. When at least four pseudo range measurements are available to the receiver, the position of the receiver can be calculated, that is the latitude, longitude, altitude and time. More generally, a Position, Velocity and Time (PVT) measurement 104 can be calculated. Multipath reflections of the GNSS signals and Doppler shifts are two examples of natural phenomena that modify respectively the shape and the phase of the received signals. They require the use of more elaborate processing to accurately determine a PVT measurement, but the main principles remain the same.

Among the processing channels of the receivers, some are dedicated to the tracking of GNSS signals, meaning that the position of a cross-correlation peak is tracked in order to follow the respective movements of the satellite and receiver. Others are dedicated to new signals acquisition: various pseudo random sequences and Doppler shifts are reviewed alternately, in order to detect new satellites in view of the receiver, as for instance processing channel 105 of FIG. 1. Processing channels performing signal acquisition focus on one pseudo random sequence, and perform cross-correlations with the signal received so as to try each possible transmission delay (i.e. phase of the pseudo random code) and frequency error, frequency errors being due to the Doppler effect and other environmental interferences. If no cross-correlation peak is detected, the receiver performs the same operation over another pseudo random sequence. This processing requires some time (typically from 1 to tens of seconds per satellite, depending on the receiver processing power) to scan all the PRN sequences, code phase delays and Doppler shift assumptions, which is the reason why receivers generally use a plurality of processing channels to perform signal acquisitions in parallel over different PRN sequences.

One issue of GNSS positioning techniques is their vulnerabilities to jamming and to signal spoofing attacks. Indeed, in current civilian GNSS applications, positioning information is not protected and lacks authentication information. In commercial or military applications, the positioning signals are protected from interception using specific or time varying pseudo random codes but this protection is limited and can be circumvented. Thus, spoofing can be a major safety issue, in particular with regard to autonomous vehicles or remote control, and the development of countermeasures to deal with spoofing is a major challenge to deploy new and reliable GNSS-based applications.

Due to the long distance between the satellites and the receivers, any signal transmitted within a GNSS frequency band from a terrestrial transmitter will easily be received with a higher power level than authentic GNSS signals transmitted from the satellites, and may clearly overshadow these signals. For this reason, jamming of GNSS receivers with any type of transmitter is relatively easy to achieve.

Likewise, spoofing of GNSS signals is made easy due to the proximity between the spoofing device and the receiver and to the capability to transmit at high power levels from ground equipments. However, it requires using equipments that are capable to transmit full-featured GNSS signals.

There are several ways to spoof a GNSS signal. The first and simplest one is to use a ground transceiver to record, delay and replay authentic GNSS signals. This technique is known under the name of meaconing. Due to the fact that the received signal actually comes from an antenna whose position is away from the authentic transceiver, the position and time calculated by the GNSS receiver are usually wrong. This technique can easily spoof a GNSS signal, but is quite coarse and can be detected to some certain extent by tracking sudden time shifts of the received signal position in the tracking loops, or by tracking sudden variations of the received signal power level. In addition, the position of the non-authentic antenna can be directly retrieved, which puts the attacker at risk.

There is more discrete and effective ways to perform GNSS signals spoofing. One of them is to generate a completely fake GNSS signal, in order to transmit false and misleading navigation messages that will be interpreted by the receiver as authentic information, and lead to a wrong positioning and/or timing of the victim receiver.

Another one is to transmit a GNSS signal that is indistinguishable from the authentic GNSS signal at first, and to progressively replace the authentic signal by first increasing the transmission power level while transmitting relevant signals, and, once the power level is sufficient so that tracking loops are locked over the fake signal, slightly alter the information contained in the navigation message and/or the pseudo-ranges to progressively drift the PVT computation. This method is harder to detect, due to the slow and graduate alterations of the authentic signal, but its complexity of implementation is high, as it requires knowledge of both the position of the authentic satellites and the position of the receiver.

Many spoofing detection and mitigation techniques are known in the prior art. As already mentioned, one of them is based on detecting signal power level variations by monitoring Automatic Gain Control (AGC) level variations, for instance. This may help detecting the instant at which coarse spoofing attacks starts, but has no effect if the monitoring of the AGC level is initiated during the spoofing attack, or when the spoofing of the authentic GNSS signal is done in a slow and progressive way. In addition, this method gives coarse information about spoofing occurrences, but does not provide information that can be exploited to effectively defeat spoofing. In a similar way, monitoring of the phase shifts associated to GNSS signals can be performed, to detect spoofing, with the same advantages and drawbacks.

A. Ranganathan, H. Olafsdottir, S. Capkun, "SPREE: A Spoofing Resistant GPS Receiver", 17 Mar. 2016, Proceedings of the 22nd Annual International Conference on Mobile Computing and Networking, describes another anti-spoofing technique. It is based on the tracking of auxiliary cross-correlation peaks, considering that even when covered by the spoofing signal, the authentic GNSS signal can be detected. To that end, when a processing channel of the receiver is dedicated to track the GNSS signal transmitted by a satellite, a second one is further dedicated to acquire and track the signal transmitted by the same satellite (same PRN code), but at a position (code phase or Doppler frequency) that is different from the first one. The assumption is that even if a spoofing device transmits a GNSS signal with a power level sufficient to cover the authentic signal transmission, the authentic signal will still be received. When the two processing channels synchronize over different GNSS signals, it is a strong sign of spoofing. However, this technique has two drawbacks: its implementation cost, as two processing channels per satellite are required, which has a strong impact on the receiver size and power consumption, and its reliability, as multipath reflections of the authentic signals are phenomenon that occur naturally and can be mitigated, but that will be erroneously interpreted as a spoofing attempt. In addition, this technique requires substantial modifications to GNSS receivers' core in order to be implemented.

In B. Ledvina, W. Bencze, B. Galusha and I. Miller, "An in-line anti-spoofing device for legacy civil GPS receivers", ION 2010 International technical meeting, Jan. 25-27, 2010, p 698-712, the same technique is presented, focusing on how the acquisition and tracking of the auxiliary cross-correlation peak can be improved when the power level of this signal is far below the power level of the spoofing signal. This technique is based on buffering the GNSS signal received, removing from the buffered GNSS signal the contributions of the tracked GNSS signal, and performing a new acquisition over the resulting signal. Due to the processing power required to perform these processing, this technique is however limited to a search space of a few chips in code phase and a thousand Hertz in Doppler frequency shift around the position tracked. In addition to the drawbacks mentioned previously, it then requires that the spoofing signal and the authentic GNSS signal are very close one to each other. The additional memory and processing required are also an implementation issue, and require modifying existing GNSS receivers' core to be implemented. The size of the search space in code phase is limited due to the additional implementation costs.

There is accordingly a need for a solution that allows an efficient detection of spoofing, and in particular for a solution which complies with existing GNSS receivers, i.e. which does not require altering their core processing.

SUMMARY OF THE INVENTION

It is an object of the invention to provide improvements over the prior art by providing a device for detecting spoofing of GNSS signals comprising:
- an RF chain to acquire and down convert a signal comprising one or more GNSS signals transmitted by GNSS sources, each of said GNSS signals comprising a navigation message modulated by a spreading code associated to a related GNSS source,
- an analog to digital converter, to digitize the down converted signal, and
- a computer logic, to:
    calculate over a grid of spreading code phase delays and Doppler shifts, cross-correlation functions between said digitized signal and locally generated replicas of the signal, for one or more of said spreading codes,
    identify cross-correlation peaks and
    analyze the cross-correlation peaks to detect spoofing situations, comprising monitoring the position of each cross-correlation peak over the grid of spreading code phase delays and Doppler shift for a number of successive signal acquisitions, and only consider cross-correlation peaks that appear in two or more successive signal acquisitions.

Advantageously, the number of Doppler shifts of the grid of spreading code phase delays and Doppler shifts may be adapted to the travel speed of the device.

Advantageously, the cross-correlation functions may be calculated in the frequency domain.

According to an embodiment of a receiver according to the invention, the cross-correlation peaks analysis comprises counting the number of cross-correlation peaks associated to a specific spreading code, a spoofing situation being detected when said number of cross-correlation peaks is greater than or equal to two.

Advantageously, when a plurality of cross-correlation peaks are within an interval a length of which is lower than a threshold, only one cross-correlation peak is counted.

According to an embodiment of a receiver according to the invention, the cross-correlation peaks analysis comprises monitoring the code phase delays associated to each cross-correlation peak for a number of successive signal acquisitions, a spoofing situation being detected when the variation speed of said code phase delays between said signal acquisitions exceeds a threshold for at least one cross-correlation peak.

According to an embodiment of a receiver according to the invention, the cross-correlation peaks analysis comprises monitoring the Doppler shifts associated to each cross-correlation peak for successive signal acquisitions, a spoofing situation being detected when the variation speed of the Doppler shift between said acquisitions exceeds a threshold for at least one cross-correlation peak.

According to an embodiment of a receiver according to the invention, the cross-correlation peaks analysis comprises monitoring the code phase delay and Doppler shift associated to a cross-correlation peak, a spoofing situation being detected when the code phase delay variation speed is not consistent with the Doppler shift value.

According to an embodiment of a receiver according to the invention, the cross-correlation peaks analysis comprises counting the number of satellites in view, and comparing said number with a threshold, a spoofing situation being declared when the number of satellites in view exceeds the threshold.

The previous embodiments are complementary and may be combined.

Advantageously, the device may be further configured to detect jamming by monitoring the level variations of an automatic gain control module configured to amplify or attenuate the power level of the received signal with a threshold, or to detect jamming by detecting spurious spectral lines within the spectrum of the GNSS signal received.

According to an embodiment, the device according to the invention is configured to be connected between a GNSS receiver and its antenna, the received signal being split in two parts, a first part being directly transmitted to the GNSS receiver, and a second part being processed by the RF chain.

Advantageously, the device according to any embodiment of the invention may comprise an output to transmit information about the spoofing situation to the GNSS receiver.

It is also an object of the invention to provide improvements over the prior art by providing a method, for detecting spoofing of a GNSS signal in a device comprising an RF chain to acquire and down convert a signal comprising one or more GNSS signals transmitted by GNSS sources, each of said GNSS signals comprising a navigation message modulated by a spreading code associated to a related GNSS source, and an analog to digital converter, to digitize the down converted signal, the method comprising the steps of:
  calculating over a grid of spreading code phase delays and Doppler shifts, cross-correlation functions between said digitized signal and locally generated replicas of the signals, for one or more of said spreading codes, identifying cross-correlation peaks, and
  analyzing the cross-correlation peaks to detect spoofing situations, comprising monitoring the position of each cross-correlation peak over the grid of spreading code phase delays and Doppler shift for a number of successive signal acquisitions, and only consider cross-correlation peaks that appear in two or more successive signal acquisitions.

BRIEF DESCRIPTION OF THE DRAWINGS

The invention will be better understood and its various features and advantages will emerge from the following description of a number of exemplary embodiments and its appended figures in which.

The examples disclosed in this specification are only illustrative of some embodiments of the invention. The invention in its broader aspects is therefore not limited to the specific details, representative methods, and illustrative examples shown and described.

DETAILED DESCRIPTION OF THE INVENTION

Figure 1:
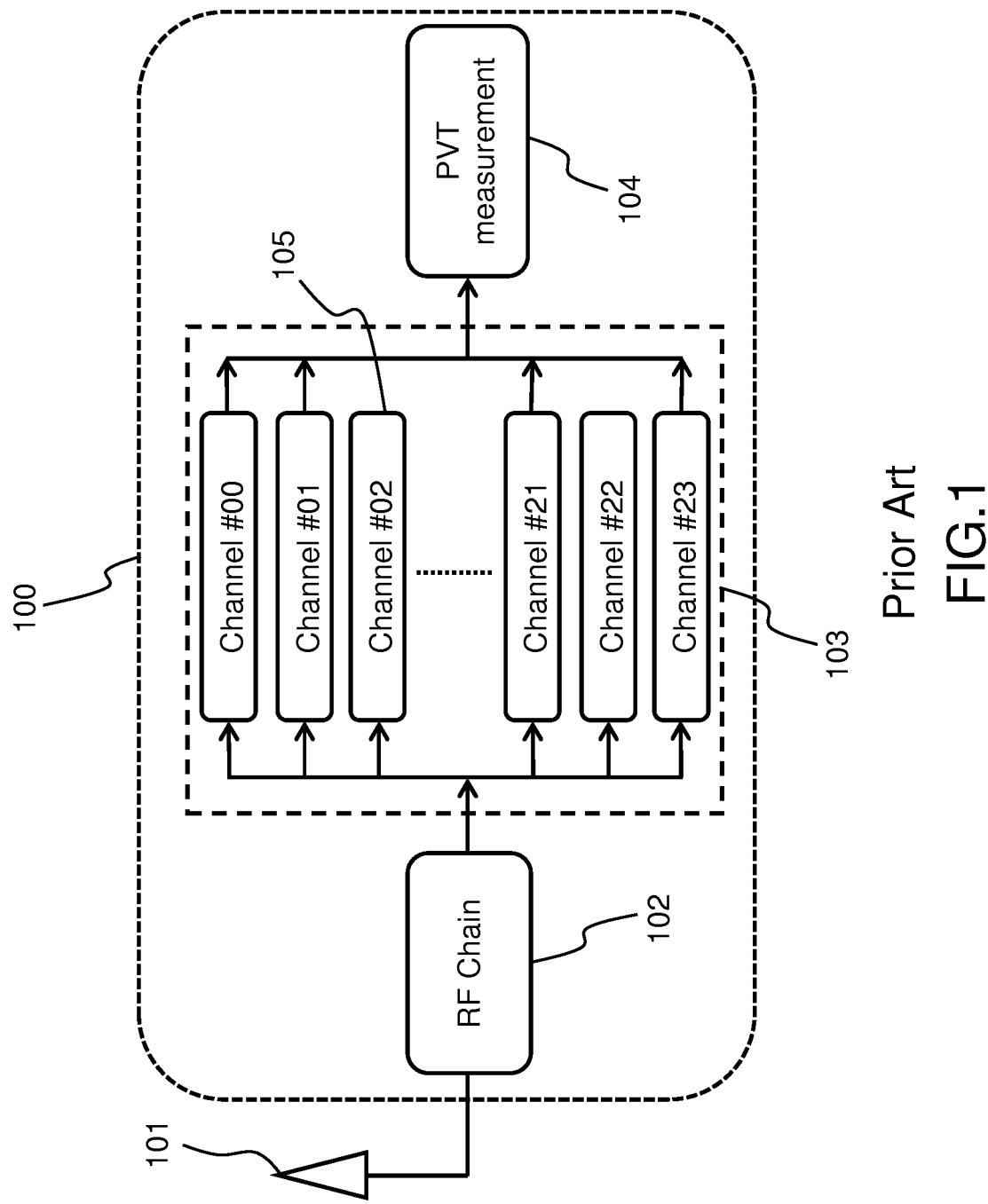
FIG. 1 schematically illustrates the main processing of GNSS receiver according to the prior art.
Figure 2:
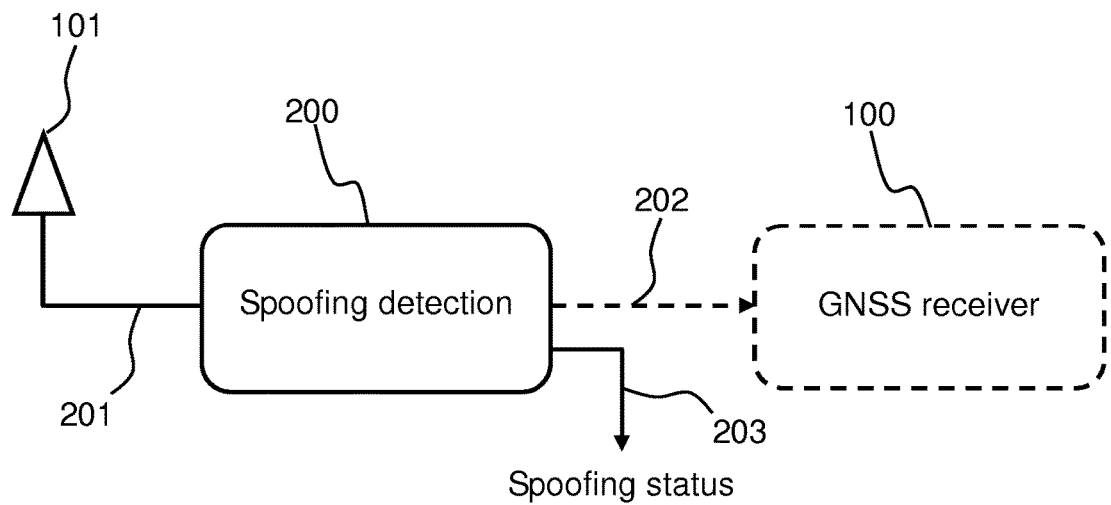
FIG. 2 represents the interfacing between a GNSS receiver and a spoofing detection device according to a first embodiment of the invention.

FIG. 2 represents the interfacing between a GNSS receiver and a spoofing detection device according to an embodiment of the invention. Spoofing detection device 200 interfaces between the GNSS receiver 100 and its Rx (reception) antenna 101. It comprises one input 201, to receive an RF signal from the antenna, a first output 202, to transmit the said RF signal to the GNSS receiver, and a second output 203, to provide information about spoofing.

The spoofing detection device is plugged between the antenna and the GNSS receiver, to ensure that the signal that is processed by the device is the same as the signal used by the GNSS receiver to compute its position. From the GNSS receiver standpoint, the spoofing detection device is transparent as it does not modify or delay the GNSS signal.

The spoofing detection device may be self powered, having batteries or its own power supply, or powered by the GNSS receiver, for example through a USB, micro-USB, or Lightning port. According to another embodiment, the antenna 101 is part of the spoofing detection device. According to various embodiments, the information about spoofing 203 may be transmitted to a screen or a computer for display, to a speaker for audible feedback to the user, or to the GNSS receiver. This embodiment is relevant when, for instance, the GNSS receiver is a smartphone having an embedded Rx antenna. As the spoofing detection device cannot be implemented between the antenna and the GNSS receiver, it has to be independent with its own Rx antenna, and operating close to the GNSS receiver. Advantageously, the data that enter the spoofing device are acquired from the same antenna as the GNSS receiver.

In another embodiment, the spoofing detection device is in a stand-alone configuration. Spoofing alarms may be recorded for later analysis or sent in real-time to a navigation system.

Spoofing detection devices may be used for any transportation applications such as autonomous vehicles, automobiles, airplanes, and boats.

The devices may be handheld. They may be associated to existing electronics equipment such as a phone or a smartwatch. They may also be associated to navigation equipments.

The information about spoofing delivered by the spoofing detection device according to one embodiment of the invention may be of many types. This output may trigger a specific action, as for instance displaying a sonic or visual alarm to notify a user that the position computed by the GNSS receiver might be spoofed, with or without additional information about the threat, as for instance the number and identifications of PRN codes that are potentially spoofed, the number of satellites in view, the occurrence of jamming, or more elaborate information like the position (in code delay phase and Doppler frequency shift) of the spoofing devices. Multiple flag levels can be used, depending on the criticality of the detected threat. This information may be displayed on a screen, or, when possible, transmitted to the GNSS receiver so that it takes the appropriate actions, as for instance denying a position authenticity check, requesting confirmation measurements, strengthening the robustness of the processing algorithms, rejecting specific pseudo ranges from the PVT computation, stopping tracking a specific PRN sequence, or any other relevant action.

Figure 3:
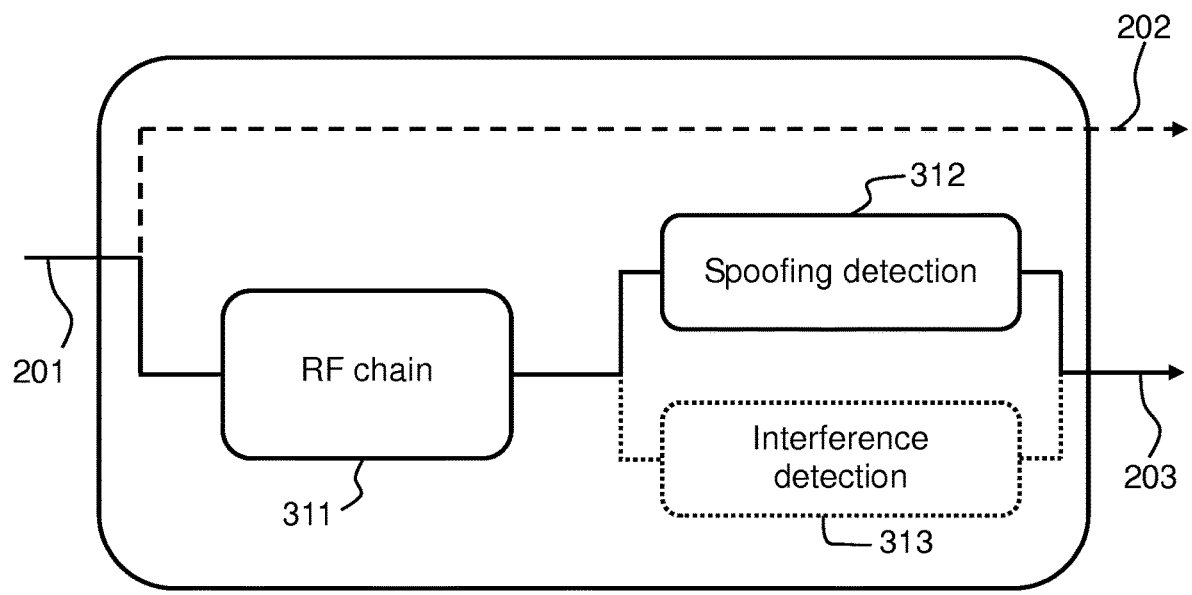
FIG. 3 describes in details the content of a spoofing detection device according to some embodiment of the invention.

FIG. 3 describes in more details the content of a spoofing detection device according to some embodiment of the invention.

It comprises one RF input 201, to receive an RF signal from an antenna. The received signal is split in two parts. From one side, it is directly transmitted to a GNSS receiver through output 202, without any modification or processing, and without introducing delay. To this end, the output 202 is directly connected to the input signal 201 once split. From the other side, processed by an RF chain 311, which is in charge of filtering, down converting and digitizing the RF signal. Down conversion of the signal consists in transposing it from the carrier frequency to baseband or intermediate frequency. Digitization is made by way of an ADC (acronym for Analog to Digital Converter). The RF chain may further perform Automatic Gain Control (AGC) processing, which consists in adapting the received power level to the signal dynamic. AGC control might be performed over the analog signal, upstream the digitization of the signal. It can also be performed over the digitized signal, or a combination thereof. Just as down conversion of the RF signal, AGC processing is common knowledge to the one skilled in radio receivers. It consists in measuring the power level of the received signal, then applying a gain to amplify or attenuate this signal. The RF chain, including AGC processing, can be implemented using COTS (acronym for Commercial Off-The-Shelf) RF chips that are available on the market and that perform this function with high sampling frequencies and resolution, as for instance device AD9364 from Analog Devices, or device MAX2769 from Maximum Integrated.

The spoofing device according to the invention further comprises some processing capabilities, as for instance a software reprogrammable calculation machine (microprocessor, microcontroller, digital signal processor (DSP), graphics processing unit (GPU), . . . ), a dedicated calculation machine (Field Programmable Gate Array (FPGA), Application Specific Integrated Circuit (ASIC), . . . ), or any other appropriate device, to detect spoofing 312. Advantageously and optionally, the processing capabilities are further configured to detect interferences 313. The spoofing and interference detection processes are described in more details hereinafter.

The aim of the spoofing detection, implemented in a device according to the invention, is to perform a complete analysis of the signal received over the Rx antenna so as to detect spoofing attempt, and if possible, to gather information about the spoofing threat.

To this end, the spoofing detection performs a 2-dimension cross-correlation between the signal received and local replicas of a positioning signal, considering one or more specific GNSS spreading sequences. The 2-dimension cross-correlations are performed so as to sweep an entire grid of code phase delays and Doppler shifts. The code phase delay is the difference between the code phase of the received signal and the code phase of a reference signal locally generated, expressed in number of chips. This delay is comprised between 0 (no delay) and one PRN sequence length. In a standard GNSS receiver, this code phase delay corresponds to a time difference between the positioning signal reception time and the time at which it was expected by the GNSS receiver, and is used to drive the tracking loops. However, as the spoofing detection device according to the invention does not need to track the various GNSS signals, the code phase delay does not directly relate to a synchronization error, but is used to differentiate the time of arrival of distinct GNSS signals. The Doppler shift is the frequency shift observed from the receiver standpoint. It depends on the relative speed between GNSS satellites and the receiver, in the propagation direction of the electromagnetic wave. This Doppler frequency shift is substantially due to the movement of the satellite. A typical Doppler shift interval considered by GNSS receivers is of [−5; +5] kHz for static or low velocity cases. This interval width may be considered by the spoofing detection software as a fixed parameter, or it can be adaptable; the interval being reduced considering for instance the travelling direction of each satellite provided by the ephemeris and almanac, and/or the travelling direction of the GNSS receiver, based on a PVT measurement or on speed information retrieved from various sensors.

Correlating the received signal with local replicas of said signal, considering an entire [code phase delay; Doppler shift] grid requires storing the received signal into a memory, and performing a cross-correlation between the received signal and a PRN sequence associated to a code phase delay and Doppler frequency shift, in a sequential or parallel manner. As the number of code phase delays to be tested can be high (for instance, the GPS L1C/A signal uses a 1024 chips spreading sequence: a typical interval would comprise 2048 code phase bins to consider a code phase bin width of 0.5 chip, but it can be higher for a better resolution), as well as the number of Doppler shift assumptions (for instance, a [−5 kHz; 5 kHz] interval with a step of 500 Hz, i.e. 21 Doppler shift bins, might be a good Doppler frequency shift grid for a GNSS receiver embedded in a car), the 2-dimension cross-correlation may require a massive computational load. In order to reduce this computational load, the 2-dimension cross-correlation may be computed in the frequency domain.

Figure 4:
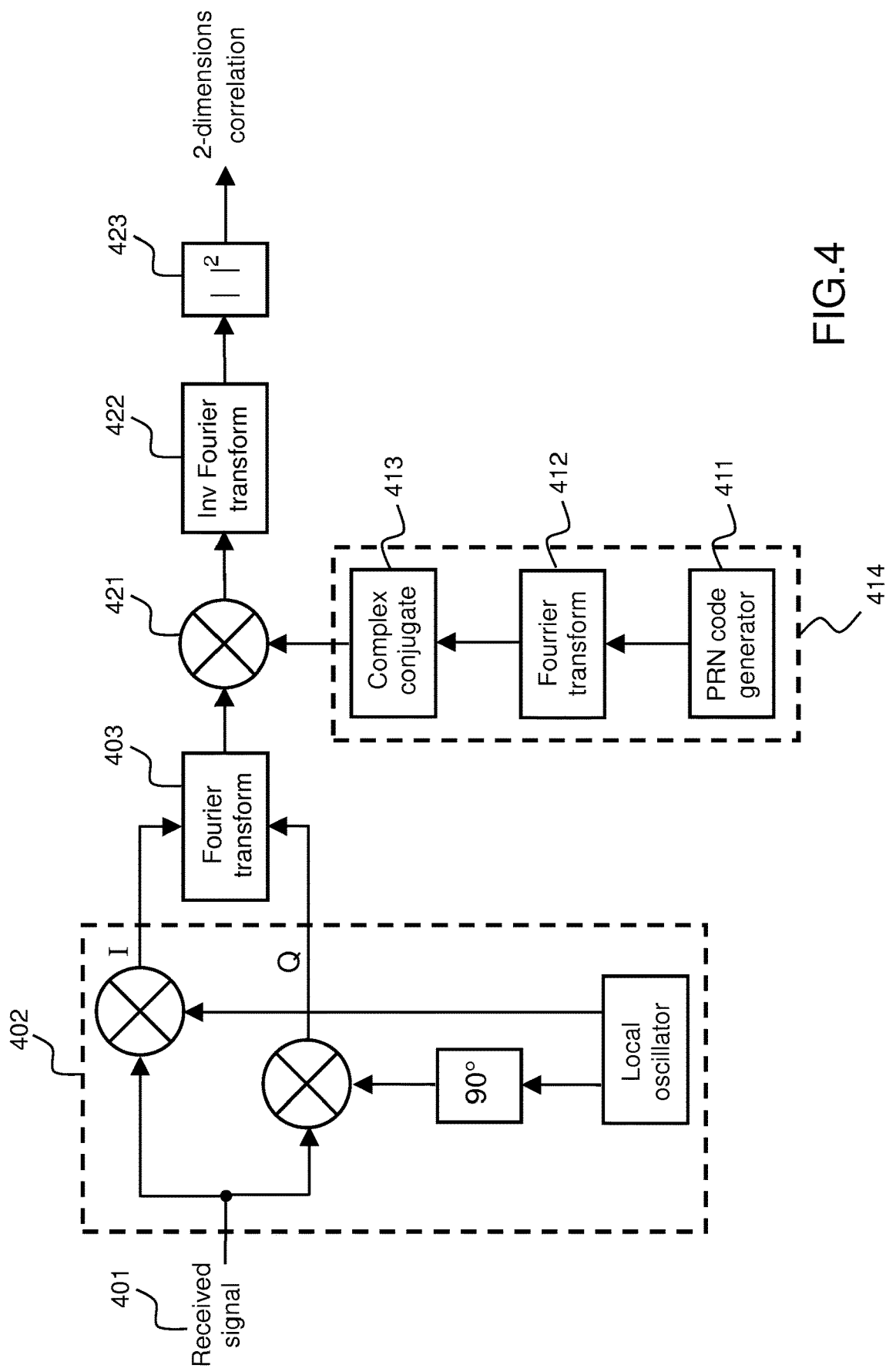
FIG. 4 represents the processing required to perform a 2-dimension cross-correlation of a received GNSS signal according to one embodiment the invention.

FIG. 4 represents the processing required to perform a 2-dimension cross-correlation of a received GNSS signal according to one embodiment of the invention.

First, the in-phase component (I) and quadrature component (Q) of the complex received signal 401 are calculated (402) through multiplication with a local carrier replica in accordance with the current Doppler shift assumption, and transposed into the frequency domain through a discrete Fourier transform, or advantageously through a Fast Fourier Transform 403 (FFT). To perform cross-correlations with a step equal to the PRN sequence chip rate, the size of the FFT must be chosen in accordance with both the spreading sequence length and the receiver's sampling frequency.

Apart from this, a PRN sequence 411 is generated for each Doppler shift bin, which depends on the standard considered. For instance, in a GPS L1C/A legacy signal, the PRN sequence is a 1023 chips Gold code whose generator polynomials are normalized. A Doppler frequency shift is added to the modulated PRN sequence by performing an incremental phase shift of the symbols depending on the Doppler frequency shift considered and the position of the symbol, or by calculating an equivalent PRN sequence in which the spreading code period has been expanded or shrank, depending on the value of the Doppler shift. The generated sequences are transposed in the frequency domain through a discrete or fast Fourier transform 412, and the complex conjugate 413 of the sequence is calculated. Advantageously, processing 411, 412 and 413 may be operated once and stored in a memory 414 of the spoofing detection device. This way, the processing required to perform the cross-correlation is reduced.

The received signal and the PRN sequence relative to each Doppler shift bin are multiplied in the frequency domain (421), and each result is transposed back to the time domain by an inverse discrete Fourier transform, for instance an inverse Fast Fourier Transform 422. The modulus 423 of the output of the inverse Fourier Transform is the result of the cross-correlation between the received signal and a PRN sequence for all code phase delays considering one particular Doppler shift bin. The code phase delay can be retrieved by directly considering the output of the inverse Fourier Transform. This approach is commonly referred to as the Parallel Code Phase Search (PCPS) technique. A Parallel Frequency Search (PFS) technique, which is also well known by those skilled in the art of radio-navigation signal processing, can be used in lieu of the PCPS technique.

Thus, computing a cross-correlation between the received signal and reference signals over a 2-dimension [code phase delay; Doppler shift] grid requires:
  processing one FFT to transpose the received signal in the frequency domain, of at least a $N_{CP}$ size, with $N_{CP}$ the number of samples of the PRN sequence period;
  storing $N_{Af}$ tables of $N_{CP}$ size, as reference signals in the frequency domain, with $N_{Af}$ the number of Doppler shift bins;
  performing $N_{Af}*N_{CP}$ symbol multiplications, to multiply the received signal in the frequency domain with the $N_{Af}$ reference sequences in the frequency domain;
  processing $N_{Af}$ IFFT to transpose the result of the multiplications to the time domain;
  calculating the modulus of the said results.

The computational load is significantly reduced, with respect to a time domain 2-dimension cross-correlation. Most of the computational load lies in the FFT/IFFT processing, which can be performed efficiently using optimized FFT-dedicated chips.

Figure 5A:
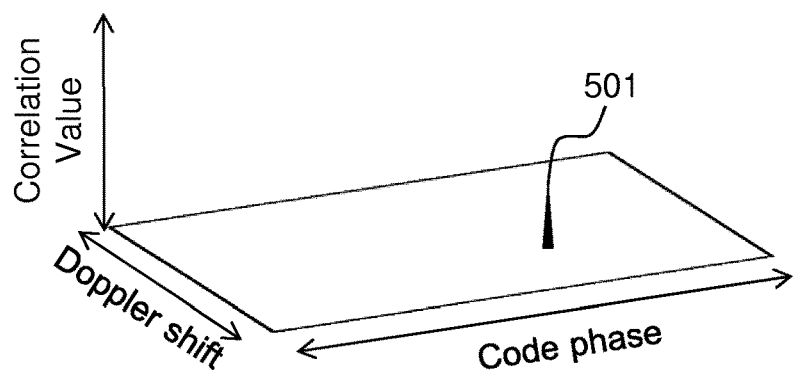
FIG. 5a is an exemplary output of a 2-dimension cross-correlation, in a perfect propagation environment.

FIG. 5a is an exemplary output of a 2-dimension cross-correlation, in a perfect propagation environment (i.e. without noise, multipath reflections and spoofing), provided for illustration purposes only.

When performing the cross-correlation process over the complete [code phase delay; Doppler shift] grid, only one cross-correlation peak 501 occurs. This property comes from the good autocorrelation properties of the PRN sequence, which is (almost) null everywhere except close to the point where the received signal and the reference signal positions match. When the signal is modulated using a BOC modulation (Binary Offset Carrier), multiple cross-correlation peaks occur. The code phase delay to consider is the position of the main peak, which is the one that has the highest value. Depending on the size of the Doppler shift bins, the cross-correlation peak may be spread over a few Doppler shift bins. The position to be considered for further processing is the position of the maximum of the cross-correlation. Many techniques are known to detect the position of the maximum cross-correlation of a GNSS signal.

When operating in real conditions, white Gaussian noise is added to the received signal. Therefore, the result of the cross-correlation may have non-negligible values at positions others than the position of the main peak. Peak detection may then be processed by first comparing the outputs of the cross-correlation with a threshold set so as to avoid false alarms while not missing actual correlation peaks. The threshold value may be computed using well-known formulas, as for instance a function of the expected C/N0 (carrier over noise ratio), the size of the PRN sequence, the number of coherent and non-coherent integrations and/or the false alarm and missed detections expected probabilities.

Figure 5B:
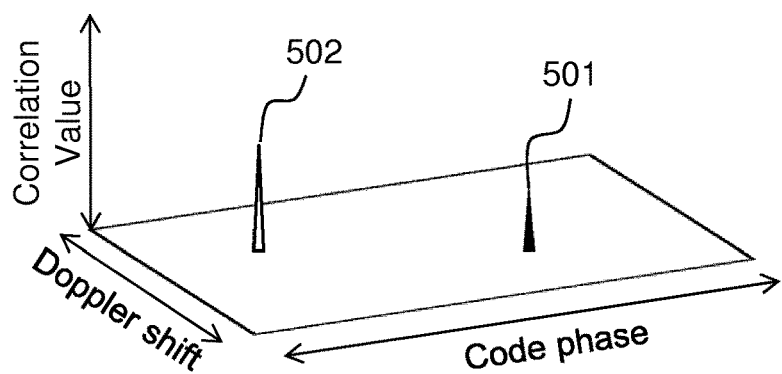
FIG. 5b is an exemplary output of a 2-dimension cross-correlation in a perfect propagation environment, in attendance of a spoofing signal.

FIG. 5b is an exemplary output of a 2-dimension cross-correlation in a perfect propagation environment, in presence of a spoofing signal. A secondary peak 502 is detected, at a position which can be anywhere in the [code phase delay; Doppler shift] grid.

One goal of the invention is to detect, and if possible to characterize, situations in which a spoofing signal is present, and in particular to distinguish such situations from situations with multipath reflections.

In an embodiment of a device for detecting spoofing according to the invention, spoofing situations are detected by counting the number of tracking peaks associated to one PRN sequence. When this number equals one, it is generally an indication that no spoofing signal is transmitted. When it is equal to zero, it is that the corresponding satellite is not in line of sight or that its received power is too low. Conversely, when the number of peaks is above one, there is a high probability that the receiver suffers from spoofing attempts.

By sweeping the whole code phase delay and Doppler shift grid, the invention performs a search for spoofing in an exhaustive way on a same signal acquisition. Contrary to searching secondary peaks using additional processing channels, where the search can take some time, even more when the position and Doppler shift of the spoofing signal varies wildly over time, the spoofing signal is detected instantaneously, regardless of its position in the [code phase delay; Doppler shift] grid. Indeed, the search for spoofing transmissions is not subject to assumptions about the position of the authentic cross-correlation peak, contrary to state of the art spoofing detection techniques where the search space is limited to positions around the peak tracked. In addition, the spoofing detection device according to the invention is fully compliant with existing GNSS receivers, and does not reduce their processing capabilities since the receiver keeps processing the unaltered RF signal from the antenna.

From the position of the two peaks, information about the relative delay between the authentic and the fake signal(s) can be retrieved, as well as the Doppler shift associated to each signal.

Another advantage of the invention is that it may cancel/ alleviate false detections generated by multipath propagation reflections.

Figure 5C:
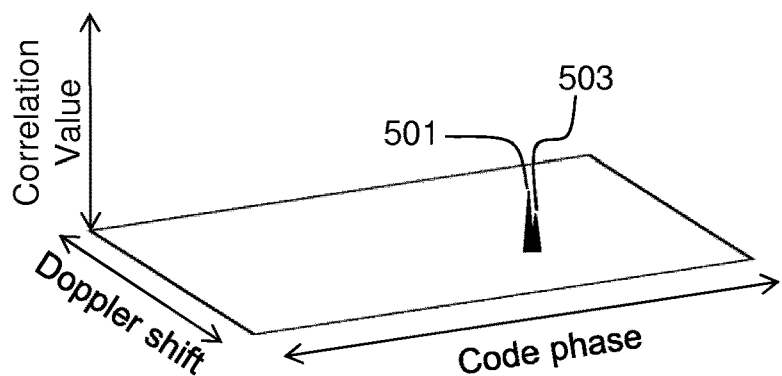
FIG. 5c is an exemplary output of a 2-dimension cross-correlation, when the propagation environment comprises multipath reflections.

FIG. 5c is an exemplary output of a 2-dimension cross-correlation, when the propagation environment comprises multipath reflections (but no spoofing signal). In that case, a secondary peak 503 occurs. As the secondary peak is a delayed version of the first peak, it is separated from the first peak 501 by an interval $\Delta_{CP}$ which is relative to the propagation time difference between the two paths. This peak is due to the propagation environment, and shall be distinguished from a peak relative to a spoofing attempt.

In a second, advantageous, embodiment of a device for detecting spoofing according to the invention, peaks that are located within a predefined distance from another peak are not considered during the phase of counting the cross-correlation peaks. To this end, only one peak is counted when counting the cross-correlation peaks, when two or more peaks are situated in an interval which length is lower than a predefined interval length. For instance, in the example of FIG. 5c, only one peak is counted as peaks 502 and 503 are separated of a distance lower than $\Delta_{CP}$. This way, multipath reflections of the authentic signal do not raise false alarms, or raise specific alarms that can be distinguished from the spoofing alarms. To this end, a threshold, in code phase, and potentially in Doppler shift, is set according to the maximum distance expected between multiple reflections of the GNSS signal, i.e. to the multipath reflections profile (indoor, outdoor, urban, rural, . . . ). Typically, multipath reflections are separated by a few hundred meters from the main propagation path, which corresponds to a maximum delay lower than one or two microseconds. However, in some circumstances, this delay may be higher. This threshold may therefore be adaptive, or set to a specific value.

The two embodiments of the invention previously described help determining spoofing attempts with a low computation load in an exhaustive fashion. The second one makes the detection device robust to multipath reflections. However, more elaborate spoofing detections may be envisaged, by monitoring variations of the position of the peaks over time.

Figure 6:
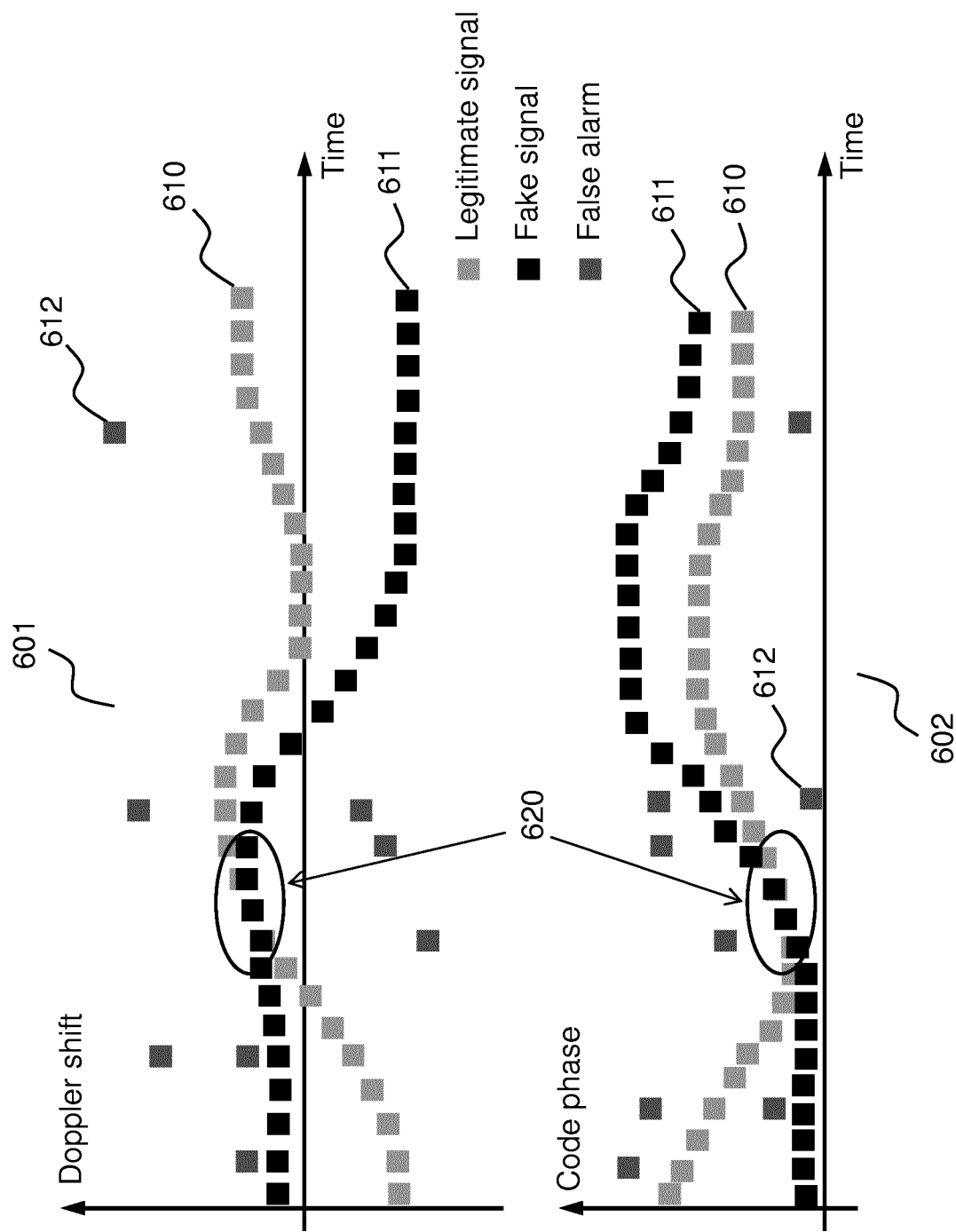
FIG. 6 illustrates variations of detected cross-correlation peaks' parameters over time in a device according to one embodiment of the invention.

FIG. 6 illustrates variations of detected cross-correlation peaks' parameters over time in a device according to one embodiment of the invention. Graphic 601 represents the Doppler shift frequencies associated to the detected peaks over time, while graphic 602 represents the code phase delay associated to the detected peaks over time.

Among the detected cross-correlation peaks, some are associated to the authentic signal 610, some are associated to the fake GNSS signal generated by the spoofing device 611, while others are false alarms 612 due to the Gaussian noise.

Cross-correlation peaks related to the authentic or to the fake signals present a certain continuity over time and their path over the code phase delay/Doppler shift grid obey some basic mathematical relationships as described in more details below, contrary to the peaks related to the white Gaussian noise. Thus, false alarm rate of the spoofing detection device can be reduced by simply removing from further processing peaks that do not present a continuity over time, that is to say peaks that are not present over two or more consecutive measurements. Some tolerance over their position shall be included in the calculations, as the Doppler frequency shift and code phase delay may vary over two successive measurements, within certain limits that depend on the application's dynamics and the time elapsed between two signal acquisitions.

When a spoofing attack is initiated, the GNSS receiver is locked on the authentic GNSS signal. The attacker does not generally know accurately the synchronization status of the receiver, and in particular the time at which the authentic signal is received and the speed/direction of the receiver. Even if the fake signal is transmitted at a high power level, the tracking loops of the receiver are very likely to keep tracking the authentic GNSS signal until the authentic and fake signals "intercept" (in area 620). Indeed, as the fake signal is received with a higher power level than the authentic signal, when both signals intercept, the fake one will overtake the authentic one. The receiver tracking loop will therefore follow the fake signal instead of the authentic one. In order, for an attacker, to reduce the time required for the GNSS receiver to track the fake signal, i.e. in order to maximize the probability of interceptions between the authentic and fake signals, spoofing devices generally modify the code phase delay and Doppler frequency shift of their signal so that they quickly browse code phase delays and/or Doppler frequency shifts.

By monitoring the variations of the cross-correlation peaks over time, the device for spoofing detection according to embodiments of the invention may be configured to detect such behavior of a spoofing device even before the receiver is locked on the fake signal.

To this end, in one embodiment, the device according to the invention may calculate the code phase delay variations over time (d(code phase)/dt, modulo one code period if necessary) of each correlation peak.

When d(code phase)/dt is higher than a threshold, there is a high probability that the associated signal comes from a spoofing device. The threshold value may be set in relation to the maximum expected Tx (transmitter)/Rx (receiver) radial speed depending on the application considered, this maximum speed being linked to the code phase shift by the following formula:

$$\frac{d_{code\ phase}}{dt} \cdot \lambda_{code} = v,$$

with v the Tx/Rx radial speed, and $\lambda_{code}$ the wavelength of the PRN sequence. The receiver clock behavior may also be taken into account to set the threshold as it contributes to the radial speed as seen from the signal processing standpoint. For instance, the threshold can be set to a radial speed of 1000 m/s, as there is a very low probability that a terrestrial GNSS receiver with standard clock reaches higher (apparent) speed in direction of a GNSS transmitter. In that case, the spoofing detection device has the capability to identify the peak that corresponds to the spoofing device, and to display or provide this information to the GNSS receiver.

According to another embodiment, the same process may be performed by monitoring the Doppler shift variations over time.

Indeed, when the absolute value of the Doppler shift variations over time abs(d(Doppler shift)/dt) is above a threshold, there is a high probability that the associated signal comes from a spoofing device. The threshold value may be set according to the maximum acceleration that is expected from the GNSS receiver. For instance, the threshold can be set to a maximum Doppler shift variation of 2 Hz/sec for a L1C/A GPS signal and a static receiver, as there is a very low probability that a static receiver reaches such a variation for this signal. The relation between the Doppler shift variation and the radial relative acceleration is given by formula:

$$\frac{d(\text{Doppler shift})}{dt} \cdot \lambda = a,$$

with $\lambda$ the wavelength of the GNSS signal, and $\alpha$ the radial relative acceleration Tx/Rx. Therefore, the spoofing detection device has the capability to identify the peak that corresponds to the spoofing device, and to display or provide this information to the GNSS receiver.

According to another embodiment, the consistency between the code phase delay variations and the Doppler shift are controlled. Indeed, the Doppler shift is related to the radial speed of the receiver with respect to the GNSS satellite considered. More specifically, $$\frac{d(\text{code phase})}{dt} = -\lambda * \text{Doppler Shift}.$$

When the GNSS satellite and the receiver move toward each other with a constant speed, the Doppler shift is positive, and conversely. Thus, it is possible to monitor the code phase delay, in order to determinate if the transmitter and receiver are getting closer or not, and to compare this information with the Doppler shift to see if the variations are consistent. If not, there is a high probability that the associated signal comes from a spoofing device that is sweeping the code phase delay/Doppler frequency shift grid to catch the tracking loops of the receiver. In that case, the spoofing detection device has the capability to identify the peak that corresponds to the spoofing device, and to display or provide this information to the GNSS receiver.

By monitoring variation of the cross-correlation peaks over time, the invention provides the capability to detect spoofing devices even if the receiver is not synchronized over the fake GNSS signal, i.e. in most cases before the fake signal can overtake the tracking loops. The position of the spoofing signal, relative to the authentic signal, as well as the associated Doppler frequency shift can be computed and transmitted to the GNSS receiver, so that it can take this information into account to avoid tracking spoofing signals.

Another technique to perform spoofing is to emulate the transmission of a satellite that is not actually in line of sight of the receiver. Such a spoofing signal will not be detected by the previous embodiments, as the receiver is not capable to receive the authentic GNSS signal transmitted by the satellite. The spoofing device will only detect one cross-correlation peak, associated to the spoofing signal, and will therefore not associate it to a spoofing attack. By judiciously adjusting the time at which a spoofing device transmits a fake GNSS signal associated to the PRN sequence associated to satellite that is not in view of the receiver, an attacker can skew a PVT measurement.

The spoofing detection device according to the invention can advantageously implement a countermeasure to defeat such threats. Indeed, the embodiment described previously may likely perform spoofing detection over all the PRN sequences associated to a GNSS constellation, in order to detect spoofing over each GNSS signal. To this end, the device may simply count the number of PRN sequences for which at least one cross-correlation peak is detected, which is the number of satellites allegedly in view of the receiver. This can be done easily over a single signal acquisition, by searching cross-correlation peaks for each possible PRN sequence of the constellation, or can be done considering successive signal acquisitions. Thus, the spoofing device according to the invention can count the number of PRN sequences for which one or more cross-correlation peaks are detected, that is to say the number of satellites allegedly in view, and compare it with a threshold. For instance, the GPS constellation comprises 31 satellites. A maximum of 12 may therefore be in line of sight at a same time for a receiver with a 0° elevation mask. This value may be used as a threshold for GPS constellations: when more than 12 GNSS signals are received, there is a strong probability that at least one of them comes from a spoofing device. This threshold may be advantageously adjusted according to the elevation mask set for each receiver and/or according to knowledge of receiver's antenna gain pattern and receiver's operating thresholds.

All the embodiments presented above can be implemented independently or in combination. The measurements required to perform the signal analysis may be performed over two successive signal acquisitions, but may also be performed over more acquisitions by calculating an average (weighted or not) over the measurements.

With respect to the prior art, the invention proposes embodiments where the analysis of the received signal is not instantaneous but is based on a sequence of analysis. Therefore, they achieve a higher precision, a higher robustness to false alarms, and they can be implemented with a limited resolution with regard to the number of Doppler shift bins assumptions.

In order to decrease the time required for spoofing a receiver, it is a common process for an attacker to first jam the authentic GNSS signal during a period of time sufficient to cause the GNSS receiver to lose the synchronization of its tracking loops and switch back to an acquisition mode where it shall probably lock on the fake, more powerful GNSS signal. Another spoofing technique lies in constantly jamming the authentic GNSS signal, at a power level sufficient to cover it but not the fake GNSS signal. The various embodiments of the invention can then be supplemented by interference detection algorithms, which can be implemented at a low cost, and are based on measurements that are already performed, to detect such jammers.

Figure 7:
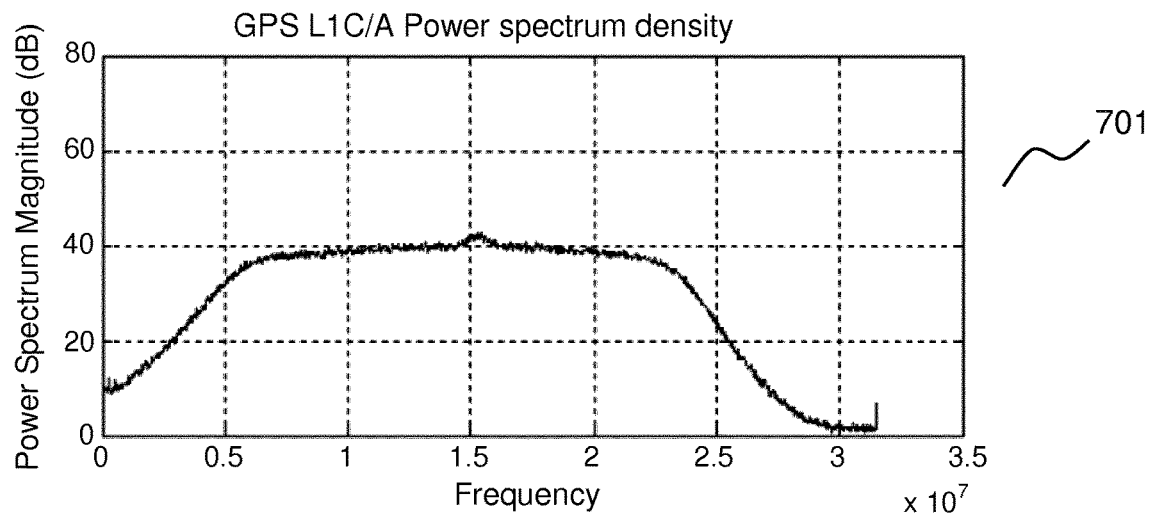
FIG. 7 represent typical spectra of GNSS signals with/without jamming.
Figure 7:
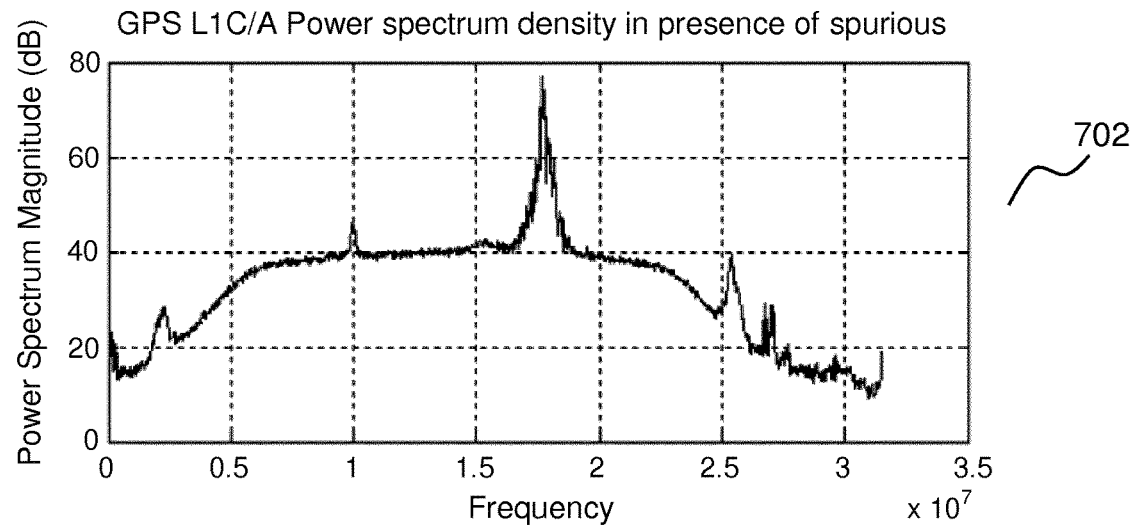

Back to FIG. 3, the interference detection measurements are computed at bloc 313, in parallel with the spoofing detection measurements. Referring now to FIG. 4, the received signal is transposed in the frequency domain, using Fourier transform 403. FIG. 7 represents typical spectra of GNSS signals with/without jamming. Spectrum 701 is a nominal spectrum of a GPS L1C/A signal on a receiver side. Jamming of said GPS signal can be achieved by transmitting, for example one or more pure carrier and/or swept carriers (spurious) within the bandwidth of the signal, as illustrated in spectrum 702. However, said spurious signals may be easily detected within the device for spoofing detection according to the invention, by simply analyzing the frequency response of the signal that is calculated in 403. For instance, this detection may be performed by calculating the mean of the frequency response of the signal within a determined bandwidth, and search for remarkable points which power level exceed a threshold to the mean power level (for instance 20 dB).

Advantageously, the interference detection may also be performed by monitoring variations of the AGC level of the device. Indeed, due to the distance between the GNSS satellites and the receiver, and to the power consumption and payload constraints at the satellite level, the GNSS signal is transmitted so as to be received at a power level that is close to or even below the noise level (see 701 where the noise level is around the 40 dB mark). Thus, the AGC level expected by the spoofing detection device level is positioned with respect to the noise power level, and is not expected to vary significantly.

Figure 8:
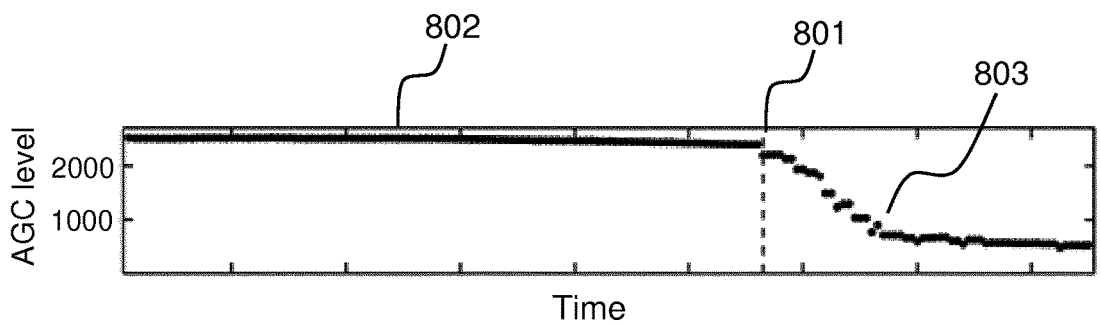
FIG. 8 illustrates AGC level variations in a receiver according to the invention, in a scenario where jamming is intended.

According to one embodiment of the invention, the interferences detection device monitors the AGC level variations that are above a threshold. FIG. 8 illustrates AGC level variations of a receiver according to the invention, in a scenario where jamming is intended. Jamming occurs at time 801. Before this moment in time, the AGC level 802 is almost constant. When jamming occurs, due to the power level of the jamming signal, the AGC level 803 suddenly decreases. That is this sudden variation that is monitored by the spoofing detection device. For instance, the threshold for jamming detection may be set to 5 dB over a predefined period of time.

Performing interference detection in addition to spoofing detection, increases the detection capabilities of the device against coarse spoofing attacks, and can be used to provide additional information about the threat, as for instance by detecting the starting and ending instants of spoofing attempts. It can also be used to modify parameters of the spoofing detection, as for instance increasing the robustness of parameters used for spoofing detection subsequent to interference detection. Interference detection can be performed advantageously within the device according to the invention, as all the required calculations are already made available from the spoofing detection process. There is therefore a high interaction between both processes.

Figure 9A:
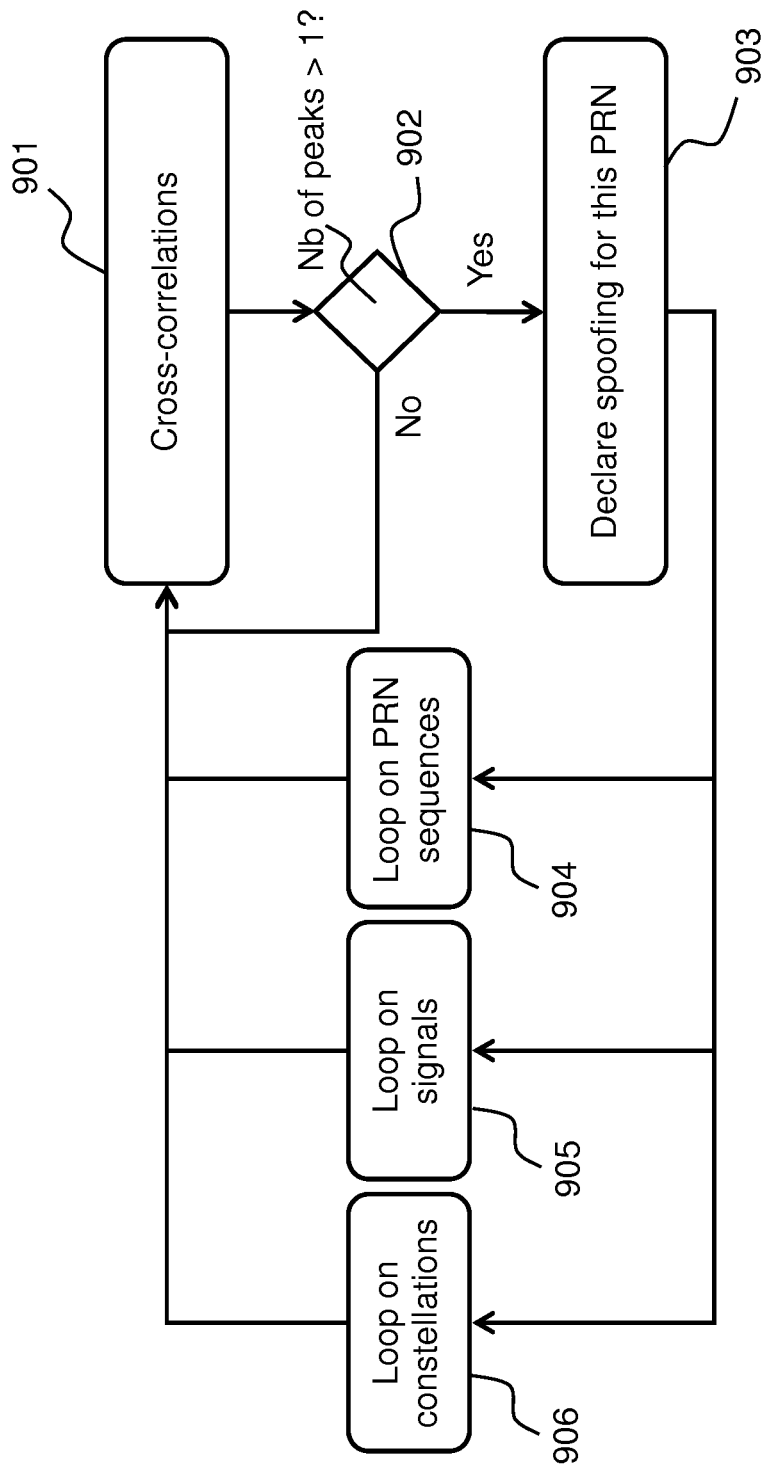
FIGS. 9a, 9b and 9c represent various embodiments of methods according to the invention.
Figure 9B:
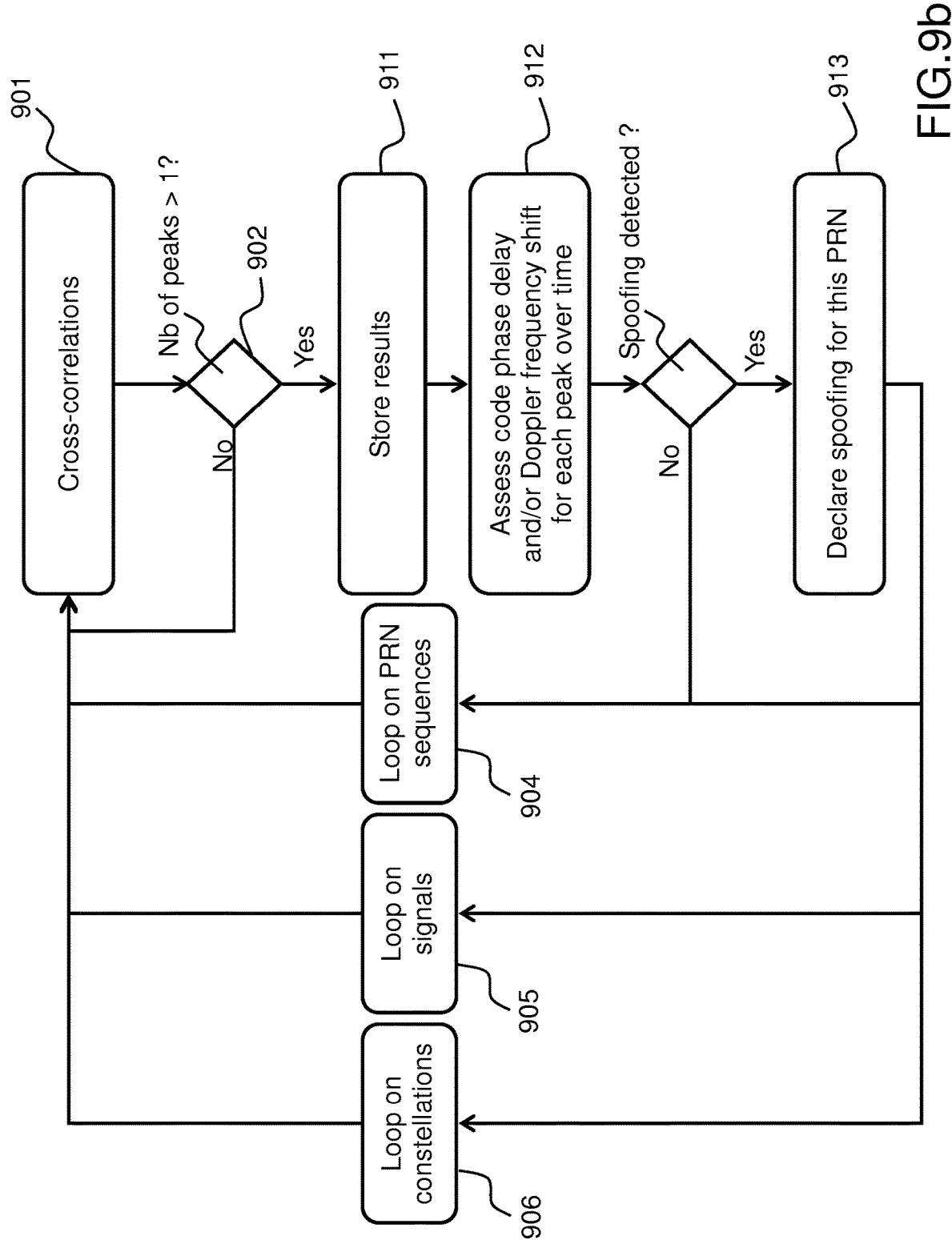
Figure 9C:
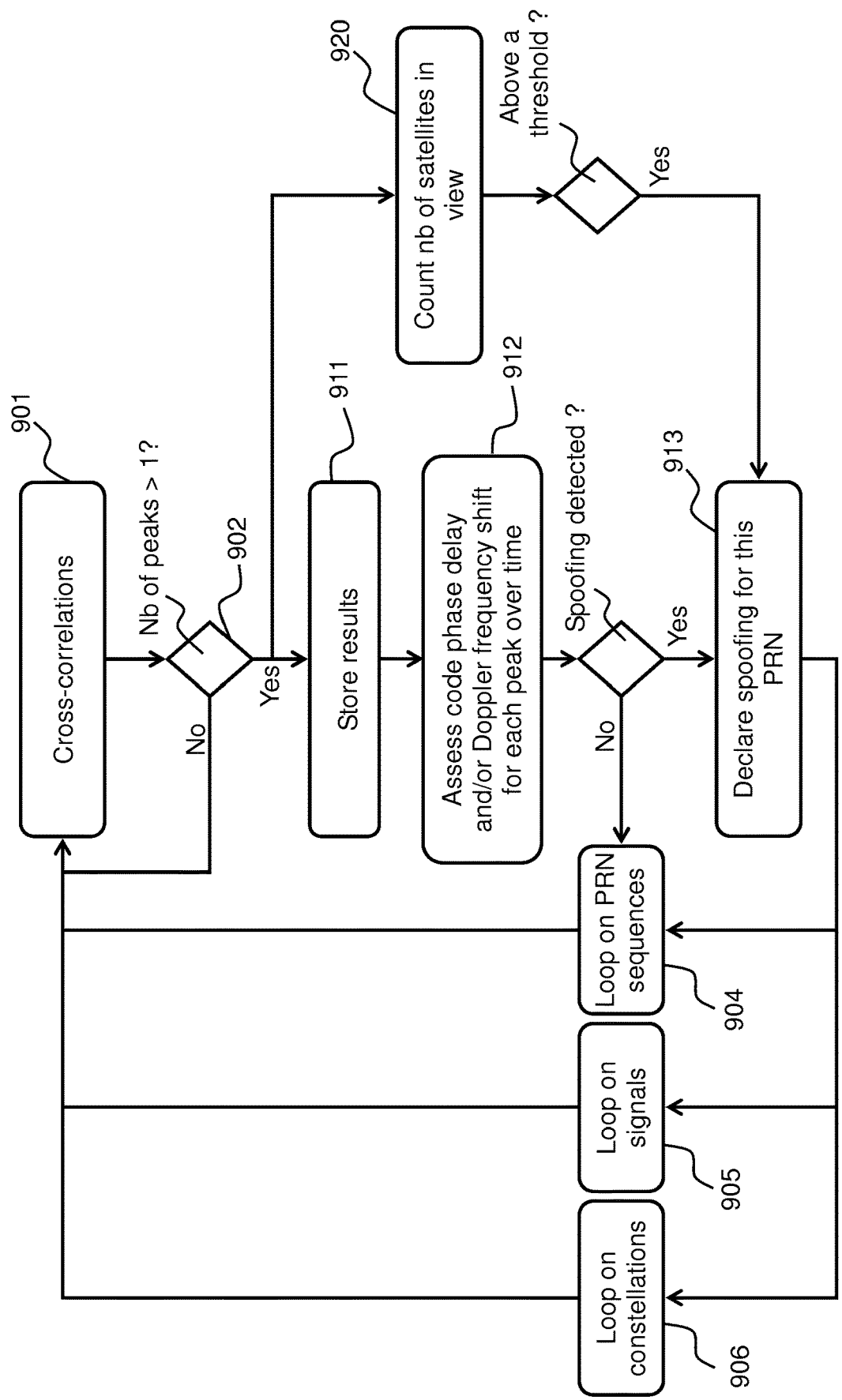

The invention further includes a method to detect spoofing. FIGS. 9a, 9b and 9c represent three embodiments of a method according to the invention. The method can be implemented in an independent device connected or not to a GNSS receiver. The device comprises an RF chain to acquire and down convert a signal received by an antenna, said signal being the sum of one or more GNSS positioning signals transmitted by GNSS sources, each of the GNSS signals being made of a navigation message modulated by a spreading code associated to the GNSS transmitter. The device further comprises an ADC, to digitize the output of the RF chain, and a computer logic, to implement the spoofing detection method according to the invention.

The method according to the invention may alternatively be implemented in a computer logic embedded in a GNSS receiver.

The embodiment of the method represented in FIG. 9a comprises a step 901 of processing cross-correlations between the digitized signal received and a plurality of references signals, in order to sweep an entire grid of code phase delays and Doppler shift combinations. The number of assumptions for the code phase delay is at least equal to the size of the spreading sequence used to modulate the positioning signal, in number of chips. The number of assumptions of Doppler shifts (i.e. the number of Doppler shift bins) may be chosen to cover the entire range of possible Doppler shifts, and depends on the use intended for the GNSS receiver. The number of Doppler shift bins tested in this range is the result of a compromise between accuracy, computing load and time required to reach a given precision.

Advantageously, the cross-correlation process can be performed in the frequency domain. That way, the processing power is reduced as it requires a Fourier transform performed over the received signal, and for each Doppler shift bin, multiplying the signal in the frequency domain with a reference signal stored in a memory and performing an inverse Fourier transform over the result.

The method comprises a step 902 of identifying the cross-correlation peaks by comparing their absolute value with a threshold. When the number of peaks detected is null or equal to one, the method loops back to step 901. When the number of peaks is higher than one, spoofing is declared (903) concerning this PRN, then the method loops back to step 901. Advantageously, cross-correlation peaks located within a predefined distance of another peak are not taken into account when counting the peaks, as potentially due to multipath reflections of the authentic signal.

Depending on the embodiment, the subsequent loops of the method according to the invention can be performed over different PRN sequences 904, different signals 905 of the GNSS system (for instance, in GPS, L1 C/A, L2C, L5 and L1C), and/or various constellations (for instance GPS, then Galileo, then Beidou, . . . ). The signal considered in 901 for calculating the cross-correlations may be a new signal acquisition for each loop of the algorithm, or it may be the same buffered signal for all the loops, provided the carrier frequency matches, saving thus one Fourier transform.

In the embodiment of FIG. 9b, when the number of detected peaks is higher than one, the positions (code phase delay and Doppler shifts) of the peaks are stored into a memory 911. In step 912, the peaks positions calculated for the current and previous iterations considering the same PRN sequence are analyzed. Depending on the embodiment, this analysis may consist in:

- searching for some continuity and/or mathematical relationship within the peaks positions over time, in order to discard peaks due to false alarms. If the number of remaining peaks is still higher than one, spoofing may be declared for the PRN sequence (913);
- detecting code phase delay variations associated to a cross-correlation peak that are above a threshold. If so, spoofing may be declared for the PRN sequence (913);
- detecting Doppler shift variations associated to a cross-correlation peak that are above a threshold. If so, spoofing may be declared for the PRN sequence (913);
- checking for inconsistencies between code phase delay variations and Doppler shifts of cross-correlation peaks. If there is no consistency, spoofing may be declared for the PRN sequence (913); or
- a combination thereof.

The embodiment of FIG. 9c further comprises a step 920, performed in parallel with the cross-correlations and peaks count, of counting the number of satellites in sight by counting the number of PRN sequences that are associated to at least one cross-correlation peak. In this embodiment, steps 911 to 913 are optional.

If the number of satellites in view is above a threshold specific to the GNSS constellation and/or the GNSS receiver chain parameters (for instance, a mask in elevation can be applied to the GNSS antenna, which has an impact on the maximum number of satellites in view for a given GNSS constellation), spoofing is declared (921).

The invention therefore provides a good indication about spoofing for all the PRN sequences of a GNSS signal over a single signal acquisition, or over a plurality of successive signal acquisitions, with a low complexity. The refresh rate between signal acquisitions may be slow (for instance one acquisition per 10 seconds) when the application is not safety critical, or can be very fast if required (for instance ten acquisitions per second), depending on the processing capabilities of the device. It can apply to various signals of various GNSS positioning systems, and can operate successively for each of said GNSS positioning systems, provided that the RF chain is adapted to the carrier frequency.

While some embodiments of the invention have been illustrated by a description of various examples, and while these embodiments have been described in considerable details, it is not the intent of the applicant to restrict or in any way limit the scope of the appended claims to such details. The invention in its broader aspects is therefore not limited to the specific details, representative methods, and illustrative examples shown and described.

The invention claimed is:

1. A device for detecting spoofing of GNSS signals comprising:
   an RF chain configured to acquire and down convert a signal comprising one or more GNSS signals transmitted by GNSS sources, each of said GNSS signals comprising a navigation message modulated by a spreading code associated to a related GNSS source,
   an analog to digital converter configured to digitize the down converted signal, and
   a computer logic configured to:
      calculate, over a grid of spreading code phase delays and Doppler shifts of one processing channel, cross-correlation functions between said digitized signal and locally generated replicas of the signal, for one or more of said spreading codes,
      identify cross-correlation peaks of the one processing channel, and
      analyze the cross-correlation peaks of the one processing channel to detect a spoofing situation and multipath reflections, wherein:
      analyzing the cross-correlation peaks to detect the spoofing situation further comprises monitoring the position of each cross-correlation peak over the grid of spreading code phase delays and Doppler shift for a number of successive signal acquisitions, and only consider cross-correlation peaks that appear in two or more successive signal acquisitions, and
      analyzing the cross-correlation peaks to detect the multipath reflections further comprises comparing a distance between each cross-correlation peak to a predetermined threshold distance.

2. The device of claim 1, wherein the number of Doppler shifts of the grid of spreading code phase delays and Doppler shifts is adapted to the travel speed of the device.

3. The device of claim 1, wherein the cross-correlation functions are calculated in the frequency domain.

4. The device of claim 1, wherein the cross-correlation peaks analysis comprises counting the number of cross-correlation peaks associated to a specific spreading code, the spoofing situation being detected when said number of cross-correlation peaks is greater than or equal to two.

5. The device of claim 4, wherein, when a plurality of cross-correlation peaks are within an interval a length of which is lower than a threshold, only one cross-correlation peak is counted.

6. The device of claim 1, wherein the cross-correlation peaks analysis comprises monitoring the code phase delays associated to each cross-correlation peak for a number of successive signal acquisitions, the spoofing situation being detected when the variation speed of said code phase delays between said signal acquisitions exceeds a threshold for at least one cross-correlation peak.

7. The device of claim 1, wherein the cross-correlation peaks analysis comprises monitoring the Doppler shifts associated to each cross-correlation peak for successive signal acquisitions, the spoofing situation being detected when the variation speed of the Doppler shift between said acquisitions exceeds a threshold for at least one cross-correlation peak.

8. The device of claim 1, wherein the cross-correlation peaks analysis comprises monitoring the code phase delay and Doppler shift associated to a cross-correlation peak, the spoofing situation being detected when the code phase delay variation speed is not consistent with the Doppler shift value.

9. The device of claim 1, wherein the cross-correlation peaks analysis comprises counting the number of satellites in view, and comparing said number with a threshold, the spoofing situation being declared when the number of satellites in view exceeds the threshold.

10. The device of claim 1, wherein the computer logic is further configured to detect jamming by monitoring the level variations of an automatic gain control module configured to amplify or attenuate the power level of the received signal with a threshold.

11. The device of claim 1, wherein the computer logic is further configured to detect jamming by detecting spurious spectral lines within the spectrum of the GNSS signal received.

12. The device of claim 1, configured to be connected between a GNSS receiver and its antenna, the received signal being split in two parts, a first part being directly transmitted to the GNSS receiver, and a second part being processed by the RF chain.

13. The device of claim 1, further comprising an output to transmit information about the spoofing situation to the GNSS receiver.

14. A method for detecting spoofing of a GNSS signal in a device comprising an RF chain to acquire and down convert a signal comprising one or more GNSS signals transmitted by GNSS sources, each of said GNSS signals comprising a navigation message modulated by a spreading code associated to a related GNSS source, and an analog to digital converter, to digitize the down converted signal, the method comprising the steps of:
   calculating, over a grid of spreading code phase delays and Doppler shifts of one processing channel, cross-correlation functions between said digitized signal and locally generated replicas of the signals, for one or more of said spreading codes,
   identifying cross-correlation peaks of the one processing channel, and
   analyzing the cross-correlation peaks of the one processing channel to detect a spoofing situation and multipath reflections, wherein:

analyzing the cross-correlation peaks to detect the spoofing situation further comprises monitoring the position of each cross-correlation peak over the grid of spreading code phase delays and Doppler shift for a number of successive signal acquisitions, and only consider cross-correlation peaks that appear in two or more successive signal acquisitions; and analyzing the cross-correlation peaks to detect the multipath reflections further comprises comparing a distance between each cross-correlation peak to a predetermined threshold distance.

\* \* \* \* \*